United States Patent
Watson

(10) Patent No.: US 7,974,741 B2
(45) Date of Patent: Jul. 5, 2011

(54) MANAGING INFORMATION RELATED TO INDUSTRIAL EQUIPMENT

(75) Inventor: David B. Watson, Waukesha, WI (US)

(73) Assignee: Dresser, Inc., Addison, TX (US)

( * ) Notice: Subject to any disclaimer, the term of this patent is extended or adjusted under 35 U.S.C. 154(b) by 755 days.

(21) Appl. No.: 12/100,545

(22) Filed: Apr. 10, 2008

(65) Prior Publication Data

US 2009/0259344 A1    Oct. 15, 2009

(51) Int. Cl.
*G05D 7/00* (2006.01)
*G05D 11/00* (2006.01)
*G01F 25/00* (2006.01)
*G01F 1/00* (2006.01)
*G01F 7/00* (2006.01)
*G01P 21/00* (2006.01)

(52) U.S. Cl. .......... 700/282; 700/275; 73/1.16; 73/1.36; 137/2; 137/8; 702/45; 702/47

(58) Field of Classification Search .................. 700/275, 700/282; 73/1.16, 1.21, 1.36; 137/2, 8, 9; 702/45–47
See application file for complete search history.

(56) References Cited

U.S. PATENT DOCUMENTS

| | | | |
|---|---|---|---|
| 4,912,657 A | 3/1990 | Saxton et al. | |
| 5,077,674 A | 12/1991 | Tischler et al. | |
| 5,548,698 A | 8/1996 | Smith et al. | |
| 5,590,329 A * | 12/1996 | Goodnow et al. | 717/144 |
| 5,592,283 A * | 1/1997 | Flesher et al. | 356/72 |
| 5,668,999 A * | 9/1997 | Gosling | 717/126 |
| 5,740,441 A * | 4/1998 | Yellin et al. | 717/134 |
| 5,758,300 A * | 5/1998 | Abe | 455/424 |
| 5,884,202 A * | 3/1999 | Arjomand | 701/29 |
| 5,999,876 A * | 12/1999 | Irons et al. | 701/115 |
| 6,064,721 A * | 5/2000 | Mohammadian et al. | 379/21 |
| 6,094,609 A | 7/2000 | Arjomand | |
| 6,104,971 A * | 8/2000 | Fackler | 701/36 |
| 6,317,727 B1 | 11/2001 | May | |
| 6,356,824 B1 * | 3/2002 | Chene et al. | 701/35 |
| 6,421,653 B1 | 7/2002 | May | |
| 6,625,504 B2 * | 9/2003 | Landreth | 700/83 |
| 6,778,979 B2 | 8/2004 | Grefenstette et al. | |
| 7,120,572 B1 * | 10/2006 | Liang | 703/26 |
| 7,124,011 B2 * | 10/2006 | Baxter et al. | 701/101 |
| 2004/0056619 A1 | 3/2004 | Jonsson et al. | |

FOREIGN PATENT DOCUMENTS

| | | |
|---|---|---|
| DE | 102 04 247 | 6/2007 |
| EP | 1 246 345 | 10/2005 |
| EP | 1 339 014 | 2/2006 |

OTHER PUBLICATIONS

Website, Symbol®, Handheld Barcode Scanners, http://www.symbol.com/products/barcode_scanners/barcode_handheld.html, printed Dec. 8, 2004, 4 pages.

* cited by examiner

*Primary Examiner* — Ramesh B Patel
(74) *Attorney, Agent, or Firm* — Fish & Richardson P.C.

(57) ABSTRACT

An electronics module for an industrial device is associated with an individual industrial device. Audit data for the industrial device is stored in a memory of the electronics module. The audit data includes information related to one or more steps that have been performed while making the individual industrial device. Operating instructions for the industrial device are stored in the memory of the electronics module. The operating instructions are operable to enable the electronics module to control and/or monitor one or more aspects of the flow control device operation.

49 Claims, 6 Drawing Sheets

MANAGING INFORMATION RELATED TO INDUSTRIAL EQUIPMENT

BACKGROUND

The present disclosure relates to communicating information related to industrial equipment.

Industrial equipment typically includes devices, systems and/or system components used for industrial applications such as energy production, the refining of resources, treatment and processing of chemicals and/or materials, resource distribution, resource transportation, processing of consumable goods (e.g., food and beverage), and fuel distribution. For example, industrial equipment may include flow control devices (e.g., valves, blowers, pumps, compressors), measurement devices (e.g., flow meters, temperature sensors), and/or fuel dispensing devices (e.g., systems that provide liquid fuel or electrical voltage).

An industrial device may include a large number of mechanical, electrical, hydraulic, pneumatic, and/or other types of components and/or subsystems, and manufacturing such a device may include numerous complex processes, such as building, testing, and modifying the device. Manufacturing the device may include many different steps implemented by different workers and/or machines at different stations. Manufacturing the device may further involve logistical tasks, for example, ordering and receiving parts for building the device, warehousing the completed device, and/or shipping the completed device.

SUMMARY

An electronics module for an industrial device is associated with an individual industrial device. Audit data and/or manufacturing instructions for the industrial device are stored in a memory of the electronics module. Operating instructions for the industrial device are also stored in the memory.

In certain aspects, an industrial device electronics module is associated with an individual industrial device. Audit data for the individual industrial device is stored in a memory of the electronics module, and the audit data includes information related to at least one step that has been performed while making the individual industrial device. Industrial device operating instructions are stored in the memory of the electronics module. The operating instructions are operable to enable the electronics module to at least one of control or monitor one or more aspects of the industrial device operation.

Implementations can include one or more of the following features. The audit data includes information related to one or more steps that have been performed while making the individual industrial device. Examples of information related to at least one step that has been performed while making the individual industrial device include: information about quality control checks performed on the individual industrial device; modifications made to the individual industrial device; dimensions of the individual industrial device; steps performed to build the individual industrial device; components incorporated into the individual industrial device, and/or others. The audit data can include logistics data. Examples of logistics data include: information related to warehousing of the individual industrial device, transportation of the individual industrial device, and/or others. Manufacturing instructions for manufacturing the industrial device can be stored in the memory. Examples of manufacturing instructions include: an identification of parts of the industrial device; general manufacturing instructions for the industrial device; manufacturing instructions related to the individual industrial device; worker-specific instructions; station-specific instructions; and/or others. The electronics module can be mounted to the industrial device. At least a portion of the audit data can be retrieved from the memory of the electronics module. The audit data comprising information concerning at least one step performed while making the individual industrial device can be collected, for example, during manufacture, testing, and/or at other times. The electronics module can a processor. The memory of the electronics module can store instructions operable to cause the processor to perform operations. The operations can include any of the operations described above. In some embodiments, the industrial device is a flow control device. The flow control device can be a valve. Example valves include a pressure relief valve, a control valve, a ball valve, a globe valve, a rotary control valve, a pneumatically controlled valve, a hydraulically controlled valve, and others. The flow control device can be a pump. Example pumps include a positive displacement pump, a centrifugal pump, and others. The flow control device can be a compressor. Example compressors include a positive displacement compressor, a centrifugal compressor, and others. The flow control device can be a blower. Example blowers include a positive displacement blower and others. In some embodiments, the industrial device is a measurement device. The measurement device can be a flow meter. The flow meter can include a positive displacement impeller meter. The measurement device can be operable to measure a flow of a fluid through a fluid transportation pipeline. Example fluids include oil, natural gas, food, beverage, and others. The measurement device can measure characteristics such as pressure, volume, temperature, electrical voltage, electrical current, electrical charge, force, mass, displacement, and others. The measurement device can include a wireless transmitter for transmitting measurement data. In some embodiments, the industrial device is a fuel dispensing device. The fuel dispensing device can include a variable proportion blending component. The fuel dispensing device can include a human-and-machine interface for displaying and receiving information. The interface can include a credit card reader to read a magnetic strip of a credit card. The fuel dispensing device can include a master and blend ratio meter. The fuel dispensing device can be operable to monitor fuel dispensed from multiple fluid sources using a common meter. The fuel dispensing device can be operable to detect the octane level of a fluid. The fuel dispensing device can be operable to dispense natural gas. The fuel dispensing device can be operable to charge a battery.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

An electronically-interfaced industrial device, or an industrial device containing electronics, may include an electronics component for controlling, monitoring, or otherwise interfacing with the device and/or one or more aspects of the device's operation. The electronics component may include a memory for storing device operating instructions and a processor for executing the operating instructions. The memory of the electronics component may also be used to store build instructions, audit data, and/or any other information related to the manufacture and/or testing of the device. Audit data, for example, may include information related to the history and/or status of the device, such as, as-built data, quality control data, logistics data, and/or other types of data. The information may be retrieved, stored, and/or updated to the memory of the electronics component for a particular device before, during, and/or after the particular device is manufactured. Using the electronics component for information management and communication may simplify and improve manufacturing (e.g., building, testing, and/or modifying a device), logistics (e.g., packaging, inventory, transportation), and/or processes that involve Management Information System (MIS) applications.

For example, information stored on an electronics module of a flow control device may include a model number for each part needed to manufacture the flow control device, and the model numbers may be retrieved by a worker who is manufacturing the flow control device. In addition, the worker may store on the electronics component additional information including a serial number of each particular part included in the flow control device. The model numbers and serial numbers for each part of the flow control device may then be readily accessible to a user of the flow control device (e.g., after the flow control device has been put into service) or to a different worker who is testing or manufacturing the flow control device. The electronics module may store data related to when and where the device was built, which workers and/or machines worked on the device, what types of tests were run on the device, how the device performed during the tests, and what modifications were made to the device as a result of the tests. The electronics module may also store data related to pre- and/or post-manufacture activities. For example, the electronics module may store data related to suppliers of parts and/or data related to the manufacture of parts received from external suppliers. As another example, the electronics module may store information related to invoicing, shipping, storing, transporting, packaging, and/or inventorying the device.

Figure 1A:
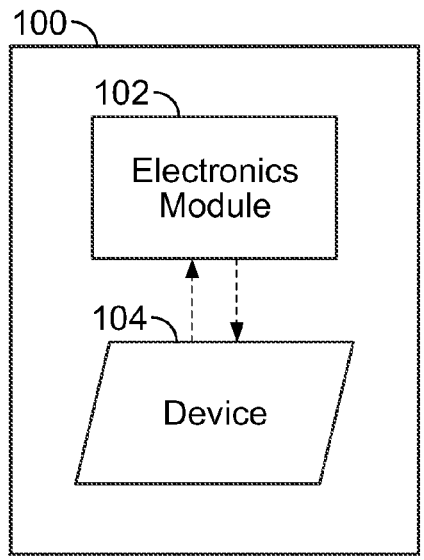
FIG. 1A is a diagram illustrating a system in accordance with some aspects of the present disclosure.

FIG. 1A is a diagram illustrating an example system 100 in accordance with some aspects of the present disclosure. The system 100 includes an electronics module 102 that controls and/or monitors one or more aspects of operation of an industrial device 104. The industrial device 104 may be a standalone device or a component of a larger industrial system. Some example devices 104 are illustrated in FIGS. 3A-3H, 4A-4D, and 5A-5C. In some implementations, the device 104 may be a flow control device (see for example FIGS. 3A-3H) such as a valve, a blower, a pump, or a compressor. In some implementations, the device 104 may be a measurement device (see for example FIGS. 4A-4D) such as a flow meter, a transducer, or a sensor. In some implementations, the device 104 may be a fuel dispensing device (see for example FIGS. 5A-5C) such as a liquid fuel dispenser or a battery charging system. The electronics module 102 may be a component of the device 104, meaning that the electronics module 102 may be physically attached to, proximate to, or included in a component of the device 104.

Figure 1B:
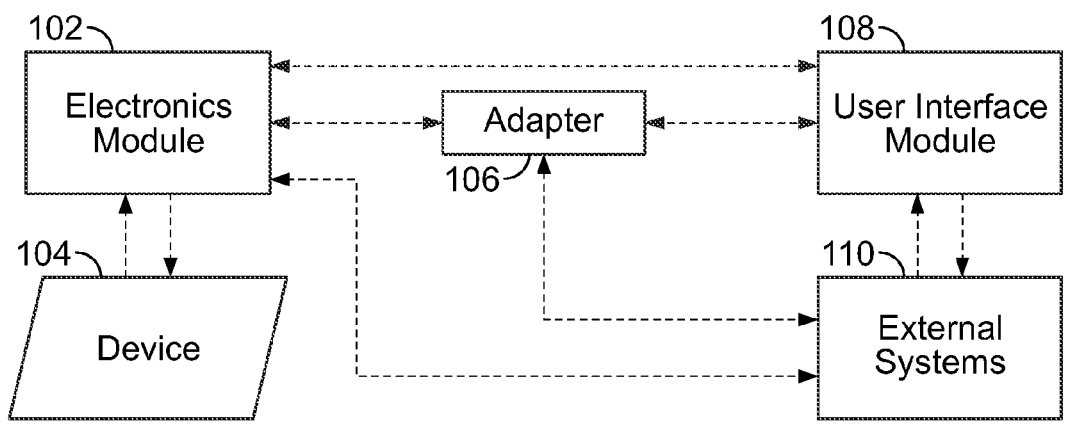
FIG. 1B is a diagram illustrating communication in accordance with some aspects of the present disclosure.

FIG. 1B illustrates communication interactions of the electronics module 102. Communication interactions of the electronics module 102 may include communication with the device 104, an adapter module 106, a user interface module 108, and/or external systems 110. External systems 110 include any system that is external to the system 100.

Figure 2A:
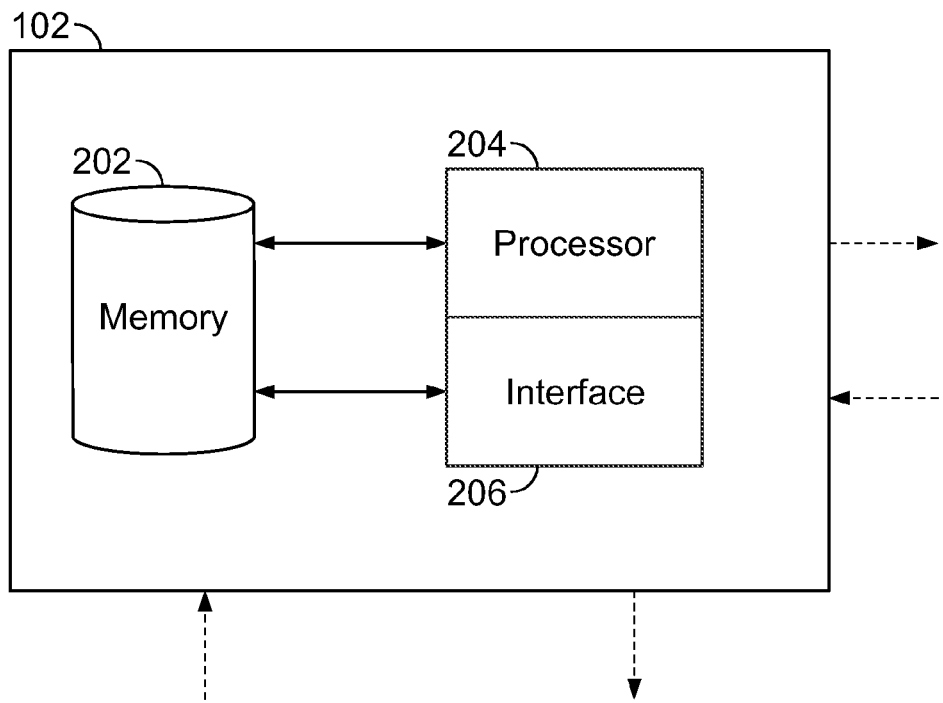
FIGS. 2A-2B are diagrams illustrating an electronics module and a user interface module, respectively, in accordance with some aspects of the present disclosure.

FIG. 2A is a diagram illustrating an example electronics module 102 in accordance with some aspects of the present disclosure. The electronics module 102 includes a processor 204 coupled to a computer readable medium or memory 202. The computer readable medium 202 may be wholly or partially removable from the electronics module 102. The computer readable medium 202 may contain instructions used by the processor 204 to operate as described herein. The electronics module 102 can receive one or more input signals and can output one or more output signals via an input/output interface 206 coupled to the processor 204 and/or the memory 202.

Apart from operating the device 104, the electronics module 102 may also store information related to making the device 104 and/or logistical information related to the device 104. To this end, the electronics module 102 may store build instructions (i.e., instructions for building the device 104) for part or all of the device 104, and the build instructions can be retrieved from the electronics module 102 concurrently with manufacturing the device 104. Concurrently with and/or after manufacturing the device 104, the electronics module 102 can be used to store audit data for the device 104. The audit data may include, for example, as-built data as well as quality control check and/or test (QC-check) data. The build instructions and audit data can be stored in the memory 202 of the electronics module 102.

The electronics module 102 may be a conventional electronics module 102 or may be specially adapted for use in communicating information relating to the manufacture of the device 104. For example, the electronics module 102 can be specially adapted to include a larger memory capacity than necessary or than would otherwise be provided for an electronics module 102 used in operating the device 104. The memory 202 can include instructions for the processor 204 that facilitate storing and accessing build instructions and audit data. For example, the instructions can enable the processor 204 to set up and maintain a database of the build instructions and audit data, format the instructions and data, and operate a communications link between the electronics module 102 and an external device used in inputting and retrieving the instructions and data.

The electronics module 102 may be configured to enable direct access to the memory 202 via the interface 206 rather than using the processor 204 in accessing the memory 202 or otherwise configured to facilitate accessing the memory 202 from outside of the electronics module 102. The electronics module 102 may be provided with additional types of data ports and/or interfaces than normally used in communicating with the particular object components or subsystems. For example, the electronics module may communicate via a specialized multi-wire interface, a standard wired electronic communication protocol, optical (e.g., infrared) interface, or a wireless interface (e.g., induction, ZigBee, WiFi, Bluetooth).

The electronics module 102 may use the adapter module 106 to communicate with the user interface module 108 and/or external systems 110. The adapter module 106 may be included in the system 100, or the adapter module 106 may itself be implemented as an external system. The adapter module 106 may be adapted to communicate with the interface 206 of the electronics module 102 to enable the electronics module 102 to communicate in a manner that it is not configured to communicate. For example, use of an adapter module 106 may enable wireless communication, such as via infrared or radio frequency, without providing such a transponder within the electronics module 102 itself.

The electronics module 102 may communicate directly with the interface module 108 or external systems 110. External systems 110 may include machines used to manufacture and/or inventory the device 104. Because pieces of industrial equipment may include a large number of components and complex manufacturing processes, build instructions are often provided to workers and/or machines involved in the manufacture of such industrial equipment. Components and subsystems of a device 104 may vary from one device 104 to another. Therefore, in an instance where different devices 104 are manufactured in the same manufacturing space, build instructions for each particular device 104 or groups of similar devices 104 are provided to the workers and/or machines involved in manufacturing the devices 104. The build instructions include various information used in manufacturing the device 104, and can include instructions for an entire system of industrial equipment or for one or more subsystems, components, or parts. Some example types of build instructions include a bill of materials, manufacturing drawings, general manufacturing instructions, manufacturing instructions specific to the particular device 104 being manufactured, and worker- or station-specific instructions. Build instructions may include instructions concerning types of audit data to collect. Additional or different information may also be included in build instructions.

A bill of materials identifies the parts and materials used in manufacturing the device 104 or a subsystem of the device 104. A listing of parts and materials may be broken down to correspond to discrete steps in the manufacture of the device 104 and include a description of each part or material and the quantity of each part or material needed to complete the step. For example, a bill of materials relating to manufacturing the device 104 may specify such details as the number, size, type, and grade of fasteners, nuts and washers required in assembling a specific part, as well as larger details such as identifying a particular casting that will be machined and included into the device 104. Additional or different information may be included on the bill of materials.

Manufacturing drawings graphically depict parts to be manufactured or assembled into the device 104. The drawings may include identification of the parts (e.g., by serial number or by make and model) or materials, as well as manufacturing dimensions and tolerances, torque specifications for fasteners, and weld information. Additional or different information may be included on the manufacturing drawings.

General manufacturing instructions include instructions that are generally applicable to manufacturing objects having a similar configuration to the device 104. For example, the general manufacturing instructions can indicate machining tolerances and procedures, the order of assembly of components, the relative placement and clearance dimensions of components, and torque specifications for fasteners. The general manufacturing instructions may also include, for example, instructions of particular quality control steps (dimensional checks, material property verifications, checks to verify the object was manufactured according to the build instructions, etc.) to be performed on the object during manufacture. Manufacturing instructions specific to the particular device 104 being manufactured are important when the particular device 104 deviates from the general manufacturing instructions for objects having a similar configuration. For example, a particular device 104 being manufactured may include optional or additional components or necessitate different treatment from other similar objects. Additional or different information may be included in the general or particular object-specific manufacturing instructions.

The general and particular object-specific manufacturing instructions may include instructions for use by machines in manufacturing the device 104. The instructions can be adapted to be input directly into the machine in a format that the machine can use to perform a step in manufacturing, or the instructions can be instructions for the worker to input information into the machine. For example, if the manufacture of the device 104 involves a computerized numerical control (CNC) mill, the manufacturing instructions can include a program to be uploaded into the mill to perform a machining step or instructions for use by a worker detailing the information to be input into the CNC mill.

Worker- or station-specific instructions may include instructions related to a particular worker or a particular station in the manufacturing of the device 104. For example, at a manufacturing site having more that one station or more than one worker for performing a step in the manufacture of the device 104, the worker- or station-specific instructions may specify which worker or station will perform the step and where the electronic module 102 and device 104 being manufactured should be delivered next. In another example, the same step may be performed by different machines at different stations. In this instance, the worker- or station-specific instructions may include special instructions on performing the step with the specific machine. Additional or different information may be included in the worker- or station-specific instructions.

As the device 104 is being manufactured or after the device 104 has been manufactured, audit data for the device 104 may be collected. The audit data may include as-built data and/or QC-check data. The audit data can include information specific to a particular device 104. The audit data collected for a particular device 104 may include specific audit data identified in the build instructions.

The as-built data can include dimensional information about the particular completed device 104. For example, many components of the device 104 may be manufactured to dimensions within a dimensional tolerance range. Thus, as the actual dimensions of the completed component can vary, the actual dimensions can be collected as as-built data. The as-built data can include information about how the device 104 was manufactured. For example, in a manufacturing space with more than one station or more than one worker who can perform a particular step, the as-built data can include information about which station or which worker performed which of the steps in manufacturing the device 104. In another example, the as-built data can include time and date information for particular steps to enable later determining information, such as which worker performed what step. The time and date information may also or alternatively provide information on the duration of each step.

The as-built data can include information specifically identifying, for example by serial number or by lot and run information, components assembled into the device 104. The as-built data can include information indicating which steps in the manufacturing process are completed and which remain. Such information, for example, if monitored during manufacturing can enable ready determination of the status of the device 104 and can be used in estimating time to completion. Different or additional information may be included in the as-built data.

The QC-check data can include information about quality control checks and/or other tests performed on the device 104, such as whether the QC-check was passed or failed and any remedial action taken. The QC-check data may include test data from tests performed on the device 104. For example, when enough of the device 104 has been manufactured for the device 104 or portions of the device 104 to be operated, the operation can be tested. Information collected during testing, such as performance data, may be included with QC-check data.

For example, a QC-check may include hydrostatic testing of a valve of a pressure chamber for compliance with manufacturer specifications or for compliance with standard specifications such as the ASME Boiler and Pressure Vessel Code. The QC-check data may indicate the date and time when the test was performed, who performed the test, what machine or testing equipment was used, and/or specific data related to the pressure chamber's response to the hydrostatic test. The QC-check data may indicate that the valve of the pressure chamber failed a first hydrostatic test, that a specific part of the valve was replaced after the first test, and that the valve of the pressure chamber passed a subsequent hydrostatic test.

In addition to as-built data and/or QC-check data, the audit data may further include logistics data. The logistics data may indicate information related to inventory, transportation, and/or invoicing of the device 104. The logistics data may include an identifier, such as a serial number, used to identify the individual device 104 for inventory purposes. The logistics data may include information related to casting, machining, forging, assembly, and/or fabrication of the various parts and/or subsystems of the device 104. The logistics data may indicate when each part was received, from whom each part was received, who tested each part after it was received, and/or how each part was tested. The logistics data may identify a purchaser of the device 104. For example logistics data may include an address, name, and other data related to a person and/or a company that ordered the device 104. Logistics data may include information about when and where the device 104 is to be shipped after it is manufactured. Logistics data may be stored on the electronics module 102 after the device 104 has been manufactured and shipped. For example, after the device 104 has been manufactured, the electronics module may store information about shipping dates, shipping carriers, transfer and/or destination locations, packaging information, as well as when and where the shipment cleared customs. The logistics data may include information about a final customer and/or intermediate vendors. The logistics data may include warehousing information such as where the device 104 was previously stored, is currently stored, or is to be stored in the future. For example, the logistics data may identify a pallet number and a storage facility where the device 104 was previously stored and the date(s) during which the device 104 was stored there.

Figure 2B:
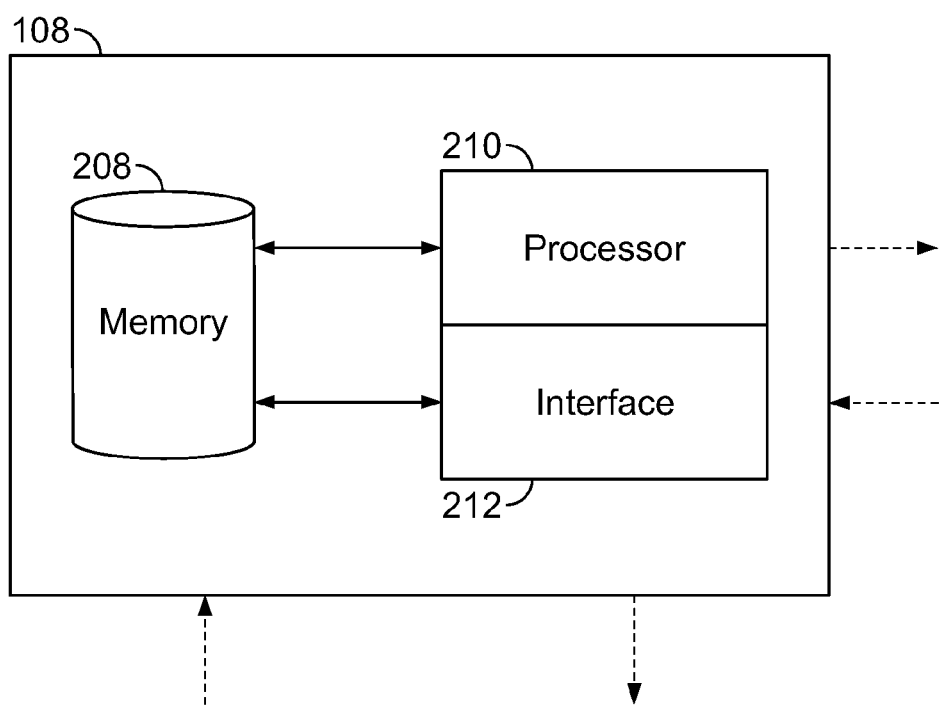

In some implementations, the user interface module 108 may be provided to enable a worker to interface with the electronics module 102. FIG. 2B is a diagram illustrating an example user interface module 108 in accordance with some aspects of the present disclosure. The user interface module 108 may include a processor 210 operably coupled to a computer readable medium or memory 208. The memory 208 may be wholly or partially removable from the user interface module 108. The memory 208 contains instructions used by the processor 210 to operate as described herein. The user interface module 108 can receive one or more input signals and can output one or more output signals via an interface 212 coupled to at least one of the processors 210 or the memory 208. The interface 212 can include interfaces for communicating with a user (i.e., a worker), such as a keypad, display screen, touch screen, and speaker and/or microphone, as well as interfaces for communicating with the electronics module 102, such as a wired communications port or wireless transponder.

The memory 208 may include instructions for the processor 210 that enable the user interface module 108 to interface and communicate data with the electronics module 102 via the interface 212. The instructions may also enable communication with a user (i.e., a worker) via the interface 212, such as by text, a graphical user interface (GUI), or audio.

For communicating with the electronics module 102 and/or external systems 110, the interface 212 may include a port corresponding to a port provided on the electronics module 102 and/or external systems 110. For example, if the electronics module 102 is provided with a specialized multi-wire interface port, the interface 212 may include a port adapted to communicate with the specialized multi-wire interface port of the electronics module 102 via a cable. In another example, if the electronics module 102 includes a universal serial bus standard port, a fiber optic port, or an interface for wireless communication, the interface 212 can include an interface adapted to communicate with the wired or wireless interface.

The user interface module 108 may be a handheld device or may be larger and reside or be affixed at a particular external system 110 (e.g., a manufacturing station). The user interface module 108 may have provisions to identify the worker using the device. For example, the user interface module may require a login to identify a particular worker. The user interface module may have provisions to identify the station at which it is being used. For example, the user interface module may prompt the worker to enter a station identifier.

Figure 3A:
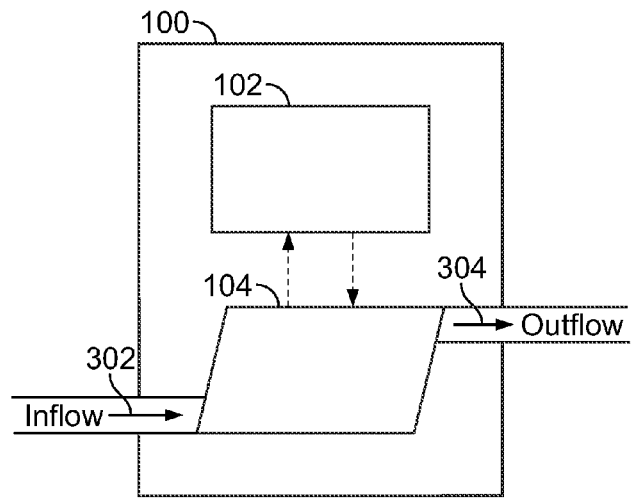
FIGS. 3A-3H are diagrams illustrating objects of manufacture in accordance with some aspects of the present disclosure.

FIG. 3A is a diagram illustrating the system 100 wherein the device 104 is a flow control device. A flow control device determines a thermodynamic or thermostatic property of a fluid, such as a flow rate, a pressure differential, or a volume. A fluid may include, individually or in combination, a gas, liquid, plasma, slurry, and/or suspension. In some implementations, a flow control device may be used for processing chemicals, such as for refining raw materials. A flow control device may also be used for controlling and/or monitoring gases and vapors in a power plant (e.g., a coal-burning power plant, a natural gas-burning power plant, a hybrid power plant, a nuclear power plant, etc.). FIGS. 3B-3H represent particular embodiments of flow control devices in accordance with the present disclosure. A flow control device, in some implementations, includes an inflow 302 and an outflow 304. The inflow 302 and/or outflow 304 may be omitted in some embodiments of a flow control device.

Figure 3B:
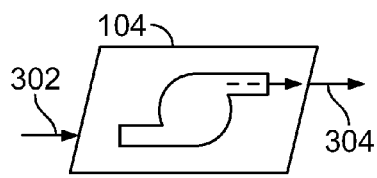

FIG. 3B illustrates the device 104 comprising a blower. A blower is a device that produces a flow of fluid between two regions or across a boundary. For example, a blower may comprise a fan. A blower may produce a gas flow between two regions, where the pressure differential across the two regions is small or negligible.

Figure 3C:
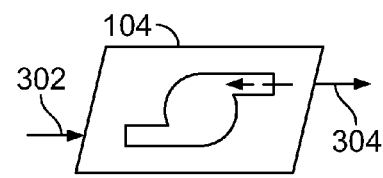

FIG. 3C illustrates the device 104 comprising a pump. A pump is a device that produces a flow of fluid across a pressure differential. The flow of fluid may be produced mechanically, chemically, thermodynamically, or otherwise. In some implementations, a pump may comprise a compressor that transfers energy to the fluid. A pump may transfer a liquid, for example, between two regions. A pump may be used to evacuate gases from a region, for example, in order to create a vacuum. A pump may include a water pump, a fuel pump, a positive displacement pump, a centrifugal pump, a kinetic pump, an axial flow pump, a chain pump, a circulator pump, a vacuum pump, a peristaltic pump, an electropump, an airlift pump, a gas compressor, a gear pump, a metering pump, a progressive cavity pump, a turbopump, a condensate pump, wind pump, a concrete pump, and/or others.

Figure 3D:
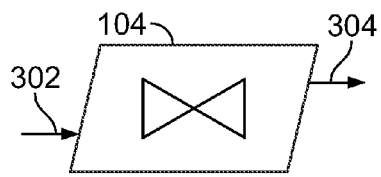

FIG. 3D illustrates the device 104 comprising a valve. A valve is a device that determines properties (e.g., geometric or thermodynamic properties) of a flow path. A valve, for example, may open, close, or otherwise reconfigure a flow path. Many different types are within the scope of the present disclosure. A valve may comprise, for example, a ball valve, a pressure relief valve, a control valve, a rotary control valve, a check valve, a globe valve, or others. A valve may regulate flow into, out of, or through a conduit.

A pressure relief valve determines a maximum directional pressure differential between two regions. For example a liquid nitrogen Dewar may include a pressure relief valve that limits the vapor pressure in the Dewar to some threshold pressure (e.g., 30 pounds per square inch) with respect to the air surrounding the nitrogen Dewar. When the vapor pressure in the nitrogen Dewar exceeds the threshold pressure, the pressure relief valve may open and allow nitrogen vapor to escape the Dewar (thus, lowering the vapor pressure below the threshold pressure).

A control valve may refer to any type of valve or valve system used to control or maintain one or more properties of fluid in an industrial system. The industrial system may, for example, be a water treatment system or a resource distribution pipeline. A rotary control valve may be a specific type of control valve that opens, closes, or reconfigures a flow path upon the rotation of one or more valve components. Two other specific types of valves are discussed with respect to FIGS. 3F and 3G.

A valve may be controlled mechanically, pneumatically, hydraulically, electromagnetically, or otherwise, and a flow control device may comprise a valve controller. For example, a valve controller may comprise a valve positioner that is operable to position, move, or otherwise reconfigure a valve or valve components. A valve positioner may operate mechanically, electromagnetically, pneumatically, hydraulically, or otherwise. A pneumatically controlled valve may be controlled (i.e., opened, closed, positioned, or otherwise reconfigured) by a pneumatic system (e.g., a system for communicating gases). A hydraulically controlled valve may be controlled (i.e., opened, closed, positioned, or otherwise reconfigured) by a hydraulic system (e.g., a system for communicating liquids).

Figure 3E:
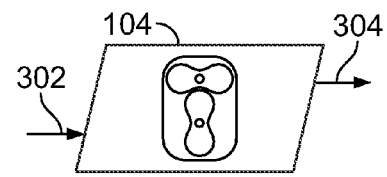

FIG. 3E illustrates the device 104 comprising a positive displacement system. A positive displacement system mechanically transfers a volume of fluid from an inlet region to an outlet region. A positive displacement system (e.g., a Roots-type system) may use rotating lobes to trap a volume of fluid and transfer the volume of fluid from an inlet port to an outlet port. A positive displacement system may be, for example, a positive displacement blower or a positive displacement pump.

Figure 3F:
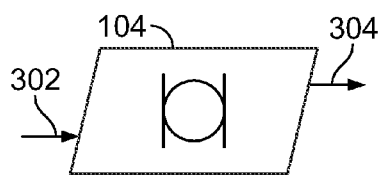

FIG. 3F illustrates the device 104 comprising a ball valve. A ball valve includes a partial spherical component in a complementary spherical chamber. The partial spherical component may be rotated within the chamber to control flow between two or more ports of the chamber. For example, a ball valve may include a solid sphere with a hollowed axis. The axis may be aligned with two ports of a chamber to allow flow between the ports, or the axis may be rotated away from the ports to prevent flow between the ports.

Figure 3G:
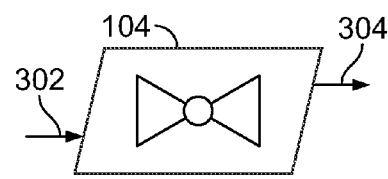

FIG. 3G illustrates the device 104 comprising a globe valve. A globe valve includes a plug and a seat. The plug may be moved with respect to the seat in order to open, close, widen, or constrict a flow path. For example, the seat may be a ring seat, the flow path between two chambers may pass through the ring seat, and the plug may be a moveable disk that sits inside the ring seat when the flow path is closed. The disk may be moved away from the ring seat in order to open the flow path.

Figure 3H:
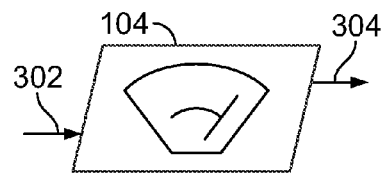

FIG. 3H illustrates the device 104 comprising a monitoring system. A monitoring system measures or detects one or more thermodynamic (e.g., flow rate) or thermostatic (e.g., temperature) properties of a fluid. For example, a monitoring system may detect a flow rate and provide feedback to a control valve. FIGS. 3B-3H are exemplary embodiments, and are not meant to illustrate the breadth of flow control devices contemplated by the present disclosure. For example, a flow control device may be any type of valve, pump, blower, fan, regulator, compressor, or other device that controls fluid flow.

Figure 4A:
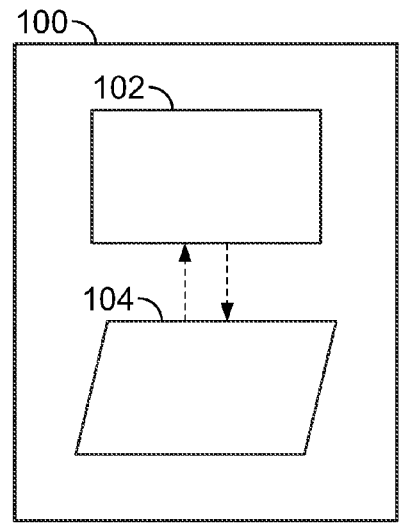
FIGS. 4A-4D are diagrams illustrating objects of manufacture in accordance with some aspects of the present disclosure.
Figure 4B:
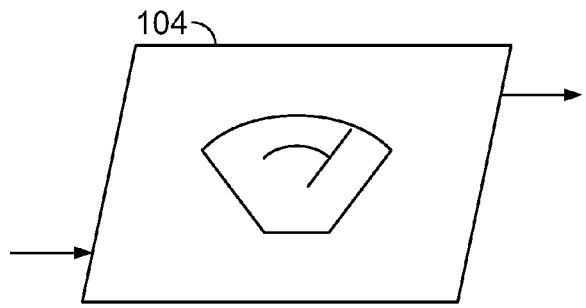
Figure 4C:
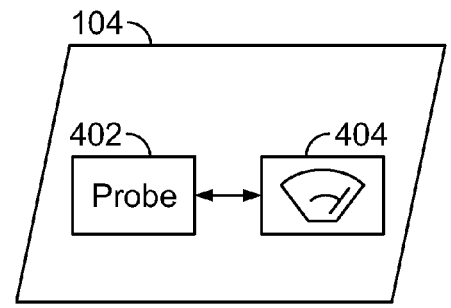
Figure 4D:
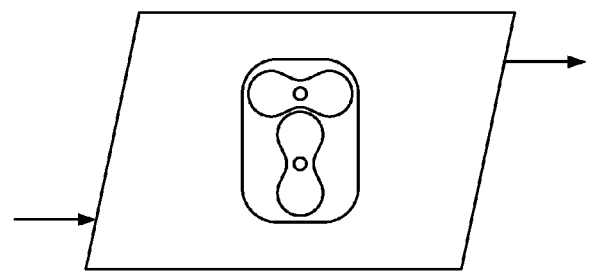

FIG. 4A is a diagram illustrating the system 100 wherein the device 104 is a measurement device. Generally, a measurement device collects information from a physical system. For example, a measurement device may collect information related to temperature, volume, pressure, flow rate, displacement, length, current, voltage, resistance, or any other physical property. The physical system (i.e., the measured system) may comprise any phase or state of matter (e.g., liquid, gas, solid, plasma, suspension, slurry). In some implementations, a measurement device may include a wireless transmitter for wirelessly transmitting measurement information (e.g., a flow rate or other flow information). FIGS. 4B-4D represent particular embodiments of measurement devices in accordance with the present disclosure. FIGS. 4B-4C are exemplary embodiments, and are not meant to illustrate the breadth of measurement devices contemplated by the present disclosure.

A measurement device may measure and control a flow of a substance through a conduit. For example, a measurement device may measure and control flow in a distribution or transportation pipeline. A distribution pipeline may distribute water to/from a water treatment facility. A distribution pipeline may also distribute resources (e.g., oil, natural gas) to/from a refinery or a drilling site. A distribution pipeline may also transport consumable goods such as foods and beverages.

FIG. 4B illustrates the device 104 comprising a flow meter. A flow meter measures a movement of fluids. For example, a flow meter may measure a quantity of fluid passing through a particular cross section per unit time. A fluid may comprise gas, liquid, plasma, slurry, and/or suspension. A flow rate may be measured in units of volume per unit time (e.g., liters per hour), mass per unit time (e.g., kilograms per second), or number of particles per unit time (e.g., moles per second). In some implementations, a flow meter may include a line mount meter, a foot mount meter, a pressure meter, or a positive displacement impeller meter.

FIG. 4C illustrates the device 104 comprising a probe 402 and a measurement system 404. A probe 402 is a device (e.g., a transducer) that transfers information (e.g., energy) between physical systems. For example, a probe may convert mechanical energy to electromagnetic energy, or chemical energy to mechanical energy. The measurement system 404 may use the probe to measure properties of a physical system and convert the measurements into electrical signals or digital data.

FIG. 4D illustrates the device 104 comprising a positive displacement impeller meter. The positive displacement impeller meter may measure a flow rate or a flow volume by measuring the amount of fluid mechanically transferred from an inlet region to an outlet region over a given time. A positive displacement impeller meter (e.g., a Roots-type measurement system) may use rotating lobes to trap a volume of fluid and as the volume of fluid is transferred from an inlet port to an outlet port.

Figure 5A:
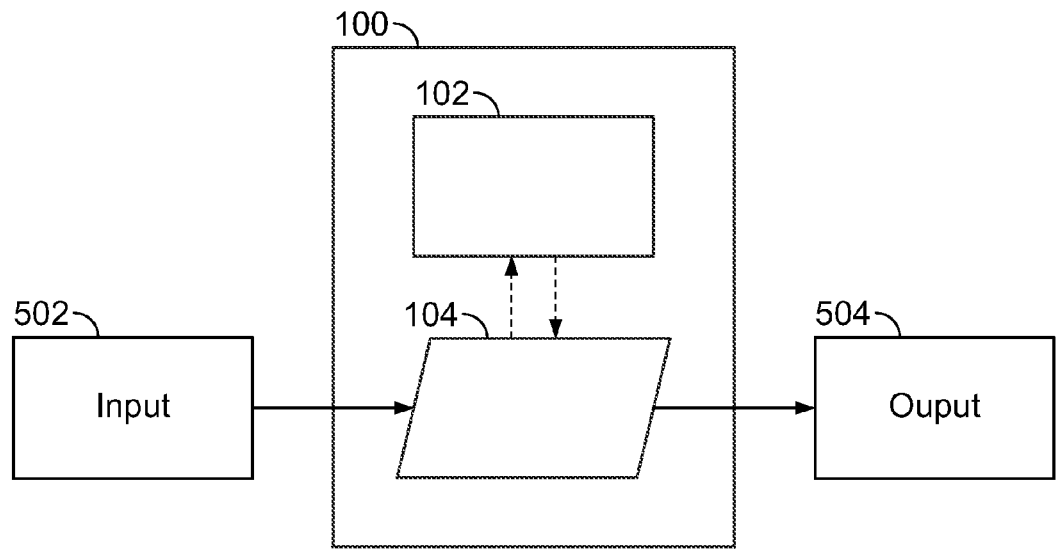
FIGS. 5A-5C are diagrams illustrating objects of manufacture in accordance with some aspects of the present disclosure.
Figure 5B:
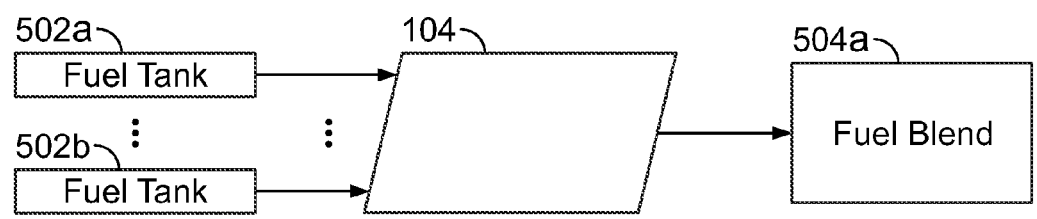
Figure 5C:
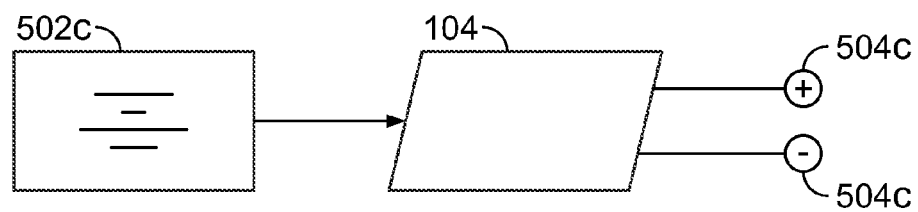

FIG. 5A is a diagram illustrating the system 100 wherein the device 104 is a fuel dispensing device. A fuel dispensing device typically provides an energy source for an electrical, mechanical, or electromechanical system. The energy source may comprise, for example, gasoline, natural gas, or electrostatic potential. For example, a fuel dispensing device may dispense gasoline into a tank of an automobile. A fuel dispensing device may, in some implementations, include a human-and-machine interface for displaying and receiving information. The human-and-machine interface may include, for example, a touch pad, a monitor for displaying text and graphics, a speaker, a credit card reader for reading credit card information, and/or other interface elements. A fuel dispensing device may, in some implementations, include measurement devices (e.g., meters) and/or flow control devices (e.g., valves). FIGS. 5B and 5C represent particular embodiments of fuel dispensing devices in accordance with the present disclosure. FIGS. 5B and 5C are exemplary embodiments, and are not meant to illustrate the breadth of fuel dispensing devices contemplated by the present disclosure. A fuel dispensing device may include an energy source input 502 and an energy source output 504. The energy source input 502 may comprise a plurality of fuel tanks or a generator.

FIG. 5B illustrates the device 104 comprising a liquid fuel dispenser. A liquid fuel dispenser transfers liquid fuel (e.g., gasoline) from one or more supply tanks (502a, 502b, etc.) to a single outlet (504a). A liquid fuel dispenser may be included in a fuel dispenser (i.e., a "gas pump") at a gas station. A liquid fuel dispenser may include a variable proportion blending component. For example, a gas station may include multiple fuel tanks, each tank containing gasoline of a different grade (e.g., octane level), and the variable proportion blending component may blend gasoline extracted from two or more of the tanks and dispense the blended gasoline into an automobile gas tank. In some implementations, a fuel dispensing device may dispense fuel from a plurality of fluid sources using a single meter (e.g., a flow meter or a volume meter). In some implementations, a fuel dispensing device may include both a master meter and blend ratio meter. The master meter may measure a total volume of fuel dispensed, and the blend ratio meter may measure the ratio of fuels extracted from different sources (e.g., a plurality of tanks). In some implementations, a fuel dispensing device may be operable to detect the octane level of a fluid. The octane level (or octane rating) may be a measure of the auto-ignition resistance of the fluid.

FIG. 5C illustrates the device 104 comprising a battery charging system. A battery charging system provides an electrostatic potential between two conducting nodes (504c). The potential difference may be produced by a generator, a capacitor, or a battery (502c), or any other electromechanical or electrochemical system. The two nodes may be conductively affixed to a battery or a capacitor (or any other device for storing electrical or electrochemical energy) in order to charge the battery or the capacitor. For example, the battery charging system may be provided at a gas station or in a home for charging (i.e., transferring electrical or electrochemical energy to) an automobile power source (e.g., a battery).

Figure 6:
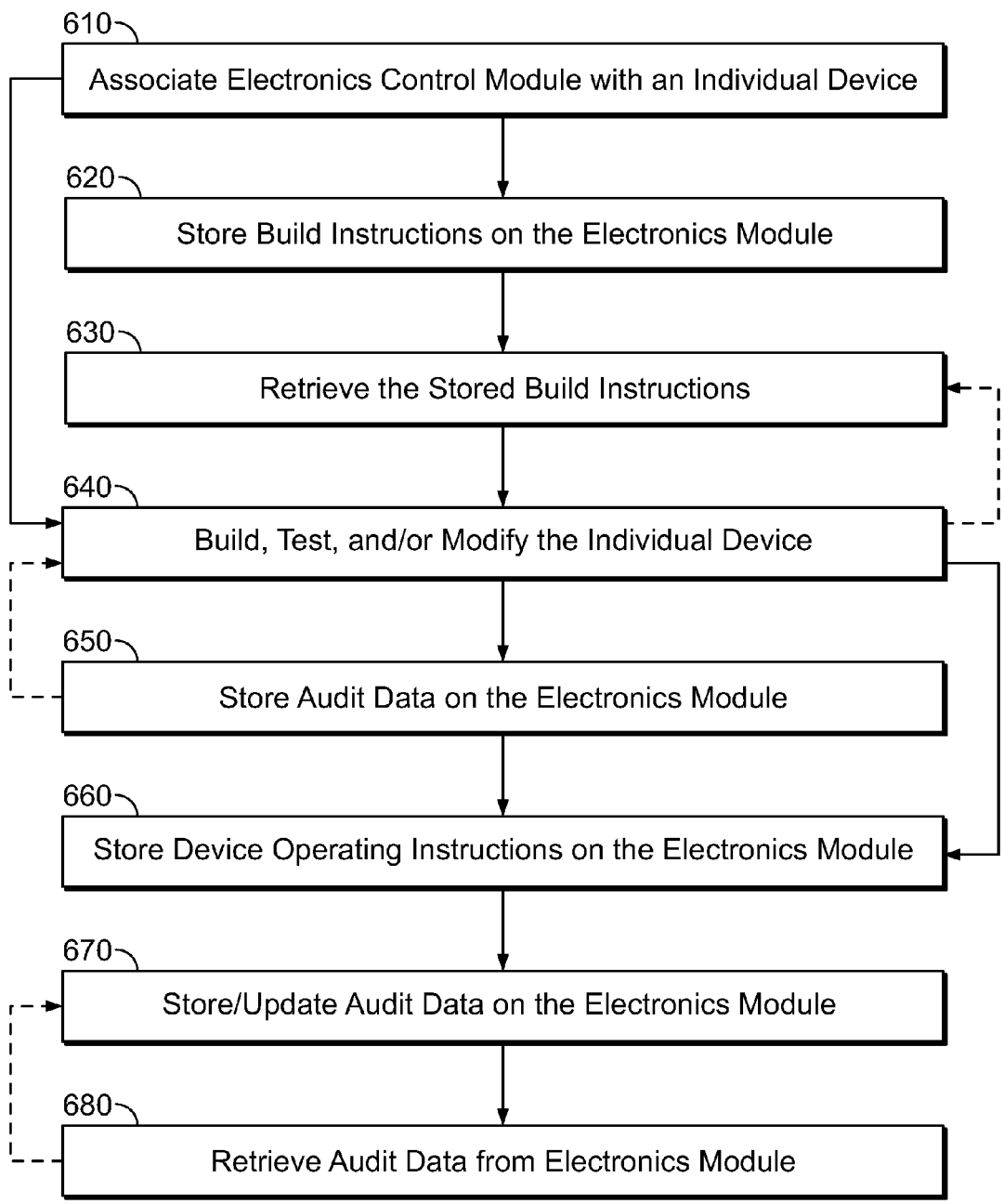
FIG. 6 is a flow chart illustrating a process for manufacturing an object in accordance with some aspects of the present disclosure.

FIG. 6 is a flow chart illustrating an example process 600 for managing information in accordance with some aspects of the present disclosure. In general, the process 600 may be used to manage information related to an electronically-interfaced industrial device. In particular, the process 600 may be used to manage information related to a device 104 as in system 100 of FIG. 1. In some implementations of the process 600, an electronics module may store build instructions for building a device. In some implementations of the process 600, the electronics module may store audit data relating to the manufacture of an individual device.

At 610, an electronics control module is associated with an individual device. For example, a serial number, an invoice number, or some other identifier of the individual device may be associated with the electronics control module. Similarly, a serial number or a different identifier of the electronics module may be associated with the individual device. In some implementations, the electronics control module is packaged with, attached to, or otherwise associated with one or more parts of the individual device.

At 620, build instructions are stored in a memory of the electronics module. For example, build instructions may include a bill of materials, manufacturing drawings, general manufacturing instructions, manufacturing instructions specific to the particular device 104 being manufactured, and worker- or station-specific instructions.

At 630, the build instructions are retrieved from the memory of the electronics module. For example, the electronics control module may be passed to a worker or a station where the device or a part of the device is to be manufactured. The worker or station may be provided with an interface module, a scanner, a receiver, or some other means of accessing the build instructions from the memory of the electronics module. The build instructions may be printed out, displayed on a monitor, verbally called out, or electronically communicated to a piece of equipment. In some implementations, 620 and 630 may be omitted. For example, build instructions may be maintained locally by the worker or station, rather than communicated using the electronics module.

At 640, the individual device is manufactured, which may include building, testing, and/or modifying the individual device. For example, the worker or machine at the station may build the device or part of the device based on the manufacturing instructions retrieved from the electronics module, or the worker or machine may operate based on instructions that were not retrieved from the electronics module. As another example, the worker or machine at the station may perform a QC-check to test one or more aspects of the device's operation or construction. As another example, the worker or machine at the station may modify the device based on the device's performance during a QC-check or test.

In some implementations, 630 and 640 may be iterated multiple times. The device may be manufactured by multiple workers at multiple different stations, and 630 and 640 may be iterated by a worker at each station. For example, the device may be built by a first worker at a first station, tested by a second worker at a second station, and modified by the first or a different worker at the first or a different station.

At 650, audit data may be stored on the electronics module. The audit data may include as-built data, QC-check data, and/or logistics data. The as-built data may identify manufacturing dates, times, and locations. The as-built data may identify workers and machines who worked on the device. The as-built data may identify part numbers and serial numbers of device components. The as-built data may identify manufacturing steps implemented during manufacture, modifications made to the device, and/or dimensional information about the device. The QC-check data may identify quality control test dates, times, types, and locations. The QC-check data may identify specific information about how the device responded to the test or how it performed during the test. The QC-check data may identify modifications made to the device based on the test. In some implementations, 640 and 650 may be iterated many times. For example, when the device is built, tested, and modified at multiple stations and/or by multiple workers, audit data may be stored at each station and/or by each worker. In some implementations, 650 may be omitted. For example, audit data may be stored in a database external to the electronics module, and then stored on the electronics module at a different time, for example at 670.

At 660, device operating instructions are stored on the electronics module. The device operating instructions may be operable to enable the electronics module to monitor and/or operate the device. For example, at 660, the electronics module may be programmed to enable some or all of the device functionality. In some implementations 660 is performed concurrently with any one of 610, 620, or 650. In some implementations, device operating instructions previously stored in the electronics module are simply updated and/or modified at 660.

At 670, audit data is stored and/or updated in the memory of the electronics module. For example, as-built data, QC-data, and/or logistics data may be stored and/or updated. Logistics data may include shipping, warehousing, invoicing, and/or transportation data. The logistics data may identify time, dates, locations, and/or workers who performed casting, machining, forging, assembly, and/or fabrication of the various parts and/or subsystems of the device. The logistics data may indicate when each part was received, from whom each part was received, who tested each part after it was received, and/or how each part was tested. Logistics data may include an address, name, and other data identifying a customer that ordered the device. Logistics data may include information about shipping dates, shipping carriers, transfer and/or destination locations, packaging information, as well as when and where the shipment cleared customs. The logistics data may include warehousing information such as where the device was previously stored, is currently stored, or is to be stored in the future. For example, the logistics data may identify a pallet number and a storage facility where the device was stored.

At 680, the audit data is retrieved from the electronics module. For example, an end user or a vendor of the device may access the memory of the electronics module. The audit data may be retrieved, for example, to identify a part number in order to replace a part of the device. The audit data may be retrieved, for example, to identify a source of material used to fabricate a part of the device. The audit data may be retrieved, for example, to identify how and when the device was made and/or shipped. In some implementations, 670 and 680 are iterated multiple times. For example, if the device is shipped back to a factory for modification, the worker who modifies the device may access audit data before modifying the device and update the audit data after modifying the device. As another example, a shipping handler or freight carrier may access a shipping destination address included in the audit data, and the handler or carrier may store an arrival date when the device is delivered to the shipping destination.

A number of advantages are enabled by the various implementations of the concepts disclosed in the present disclosure. For example, instructions and information related to manufacturing a device may be conveniently communicated in a single instrument, the electronics module. More so, the electronics module may be part of the device itself.

Another advantage is that the audit data collected from the manufacture of the device is collected in electronic format. The information in electronic format may be easily transferable from the electronics module to other devices without necessitating conversion between media types and without incurring all of the errors that may stem from conversion. For example audit data recorded in a paper logbook may require conversion to an electronic format for storage in a computer database and could suffer conversion errors. Also, because the audit data may be initially collected in electronic format, the data may be conditioned (e.g., normalized for use in an computer database) as it is being entered, and transfer from electronics module to other devices may be almost instantaneous.

A number of embodiments have been described. Nevertheless, it will be understood that various modifications may be made without departing from the spirit and scope of this disclosure. Accordingly, other embodiments are within the scope of the following claims.

What is claimed is:

1. A method of managing information related to a flow control device, the method comprising:
    associating a flow control device electronics module with an individual flow control device;
    storing audit data for the individual flow control device in a memory of the electronics module, the audit data comprising information related to at least one step that has been performed while making the individual flow control device; and
    storing flow control device operating instructions in the memory of the electronics module, the operating instructions operable to enable the electronics module to at least one of control or monitor one or more aspects of the flow control device operation.

2. The method of claim 1, further comprising mounting the electronics module to the flow control device.

3. The method of claim 1, further comprising retrieving at least a portion of the audit data from the memory of the electronics module.

4. The method of claim 1, the audit data further comprising logistics data.

5. The method of claim 4, wherein:
    information related to at least one step that has been performed while making the individual flow control device comprises information about at least one of quality control checks performed on the individual flow control device; modifications made to the individual flow control device; dimensions of the individual flow control device; steps performed to build the individual flow control device; or components incorporated into the individual flow control device; and
    logistics data comprises information related to at least one of warehousing of the individual flow control device or transportation of the individual flow control device.

6. The method of claim 1, further comprising storing manufacturing instructions for manufacturing the flow control device.

7. The method of claim 6, wherein the manufacturing instructions comprise at least one of:
    an identification of parts of the flow control device;
    general manufacturing instructions for the flow control device;
    manufacturing instructions related to the individual flow control device;

worker-specific instructions; or station-specific instructions.

8. The method of claim 1, wherein the flow control device is a valve.

9. The method of claim 8, wherein the valve comprises at least one of a pressure relief valve, a control valve, a ball valve, a globe valve, a rotary control valve, a pneumatically controlled valve, or a hydraulically controlled valve.

10. The method of claim 1, wherein the flow control device is a pump.

11. The method of claim 10, wherein the pump comprises at least one of a positive displacement pump or a centrifugal pump.

12. The method of claim 1, wherein the flow control device is a compressor.

13. The method of claim 12, wherein the compressor comprises at least one of a positive displacement compressor or a centrifugal compressor.

14. The method of claim 1, wherein the flow control device is a blower.

15. The method of claim 14, wherein the blower comprises a positive displacement blower.

16. The method of claim 1, further comprising collecting the audit data comprising information concerning at least one step performed while making the individual flow control device.

17. The method of claim 1, wherein the electronics module further comprises a processor; and wherein the memory stores instructions operable to cause the processor to perform operations comprising:

associating the flow control device electronics module with the individual flow control device;

storing the audit data for the individual flow control device in the memory of the electronics module; and storing the flow control device operating instructions in the memory of the electronics module.

18. A method of managing information related to a measurement device, the method comprising:

associating a measurement device electronics module with an individual measurement device;

storing audit data for the individual measurement device in a memory of the electronics module, the audit data comprising information related to at least one step that has been performed while making the individual measurement device; and storing measurement device operating instructions in the memory of the electronics module, the operating instructions operable to enable the electronics module to at least one of control or monitor one or more aspects of the measurement device operation.

19. The method of claim 18, further comprising mounting the electronics module to the measurement device.

20. The method of claim 18, further comprising retrieving at least a portion of the audit data from the memory of the electronics module.

21. The method of claim 18, the audit data further comprising logistics data.

22. The method of claim 21, wherein:

information related to at least one step that has been performed while making the individual measurement device comprises information about at least one of quality control checks performed on the individual measurement device; modifications made to the individual measurement device; dimensions of the individual measurement device; steps performed to build the individual measurement device; or components incorporated into the individual measurement device; and logistics data comprises information related to at least one of warehousing of the individual measurement device or transportation of the individual measurement device.

23. The method of claim 18, further comprising storing manufacturing instructions for manufacturing the measurement device.

24. The method of claim 23, wherein the manufacturing instructions comprise at least one of:

an identification of parts of the measurement device;

general manufacturing instructions for the measurement device;

manufacturing instructions related to the individual measurement device;

worker-specific instructions; or station-specific instructions.

25. The method of claim 18, wherein the measurement device is a flow meter.

26. The method of claim 25, wherein the flow meter comprises a positive displacement impeller meter.

27. The method of claim 18, wherein the measurement device is operable to measure a flow of a fluid through a fluid transportation pipeline.

28. The method of claim 27, wherein the fluid comprises at least one of oil, natural gas, food, or beverage.

29. The method of claim 18, wherein the measurement device measures at least one of pressure, volume, temperature, electrical voltage, electrical current, electrical charge, force, mass, or displacement.

30. The method of claim 18, wherein the measurement device comprises a wireless transmitter for transmitting measurement data.

31. The method of claim 18, further comprising collecting the audit data comprising information concerning at least one step performed while making the individual measurement device.

32. The method of claim 18, wherein the electronics module further comprises a processor; and wherein the memory stores instructions operable to cause the processor to perform operations comprising:

associating the measurement device electronics module with the individual flow control device;

storing the audit data for the individual measurement device in the memory of the electronics module; and storing the measurement device operating instructions in the memory of the electronics module.

33. A method of managing information related to a fuel dispensing device, the method comprising:

associating a fuel dispensing device electronics module with an individual fuel dispensing device;

storing audit data for the individual fuel dispensing device in a memory of the electronics module, the audit data comprising information related to at least one step that has been performed while making the individual fuel dispensing device; and storing fuel dispensing device operating instructions in the memory of the electronics module, the operating instructions operable to enable the electronics module to at least one of control or monitor one or more aspects of the fuel dispensing device operation.

34. The method of claim 33, further comprising mounting the electronics module to the fuel dispensing device.

35. The method of claim 33, further comprising retrieving at least a portion of the audit data from the memory of the electronics module.

36. The method of claim 33, the audit data further comprising logistics data.

37. The method of claim 36, wherein:
information related to at least one step that has been performed while making the individual fuel dispensing device comprises information about at least one of quality control checks performed on the individual fuel dispensing device; modifications made to the individual fuel dispensing device; dimensions of the individual fuel dispensing device; steps performed to build the individual fuel dispensing device; or components incorporated into the individual fuel dispensing device; and
logistics data comprises information related to at least one of warehousing of the individual fuel dispensing device or transportation of the individual fuel dispensing device.

38. The method of claim 33, further comprising storing manufacturing instructions for manufacturing the fuel dispensing device.

39. The method of claim 38, wherein the manufacturing instructions comprise at least one of:
an identification of parts of the fuel dispensing device;
general manufacturing instructions for the fuel dispensing device;
manufacturing instructions related to the individual fuel dispensing device;
worker-specific instructions; or
station-specific instructions.

40. The method of claim 33, wherein the fuel dispensing device comprises a variable proportion blending component.

41. The method of claim 33, wherein the fuel dispensing device comprises a human-and-machine interface for displaying and receiving information.

42. The method of claim 41, wherein the interface comprises a credit card reader to read a magnetic strip of a credit card.

43. The method of claim 33, wherein the fuel dispensing device comprises a master and blend ratio meter.

44. The method of claim 33, wherein the fuel dispensing device is operable to monitor fuel dispensed from a plurality of fluid sources using a common meter.

45. The method of claim 33, wherein the fuel dispensing device is operable to detect the octane level of a fluid.

46. The method of claim 33, wherein the fuel dispensing device is operable to dispense natural gas.

47. The method of claim 33, wherein the fuel dispensing device is operable to charge a battery.

48. The method of claim 33, further comprising collecting the audit data comprising information concerning at least one step performed while making the individual fuel dispensing device.

49. The method of claim 33, wherein the electronics module further comprises a processor; and
wherein the memory stores instructions operable to cause the processor to perform operations comprising:
associating the measurement device electronics module with the individual fuel dispensing device;
storing the audit data for the individual fuel dispensing device in the memory of the electronics module; and
storing the fuel dispensing device operating instructions in the memory of the electronics module.

* * * * *

UNITED STATES PATENT AND TRADEMARK OFFICE
CERTIFICATE OF CORRECTION

| | |
|---|---|
| PATENT NO. | : 7,974,741 B2 |
| APPLICATION NO. | : 12/100545 |
| DATED | : July 5, 2011 |
| INVENTOR(S) | : David B. Watson |

It is certified that error appears in the above-identified patent and that said Letters Patent is hereby corrected as shown below:

In the drawings, Sheet 5, Fig. 5A, Reference Numeral 504, delete "Ouput" and insert -- Output -- therefor.

Column 6, line 32, delete "that" and insert -- than -- therefor.

Signed and Sealed this
Twenty-third Day of August, 2011

David J. Kappos
*Director of the United States Patent and Trademark Office*